United States Patent [19]  
Borbely et al.

[11] Patent Number: 4,537,686  
[45] Date of Patent: Aug. 27, 1985

[54] CYANIDE REMOVAL FROM AQUEOUS STREAMS

[75] Inventors: Gyula J. Borbely, Copper Cliff; Eric A. Devuyst, Toronto; Victor A. Ettel, Mississauga; Marcel A. Mosoiu, Toronto; Konstantin J. Schitka, Sudbury, all of Canada

[73] Assignee: INCO Limited, Toronto, Canada

[21] Appl. No.: 587,611

[22] Filed: Mar. 8, 1984

[51] Int. Cl.$^3$ .................................................. C02F 1/58
[52] U.S. Cl. ..................................... 210/713; 210/721; 210/763; 210/904
[58] Field of Search ............................... 210/761–763, 210/904, 721, 712, 719, 724, 726, 757, 912, 713

[56] References Cited

U.S. PATENT DOCUMENTS

| | | | |
|---|---|---|---|
| 3,650,949 | 3/1972 | Hager et al. | 210/904 X |
| 4,006,216 | 2/1977 | Ettel et al. | 423/592 |
| 4,024,037 | 5/1977 | Bishop et al. | 210/904 X |
| 4,070,281 | 1/1978 | Tagashira et al. | 210/904 X |
| 4,312,760 | 1/1982 | Neville | 210/904 X |

OTHER PUBLICATIONS

Electroplating Engineering Handbook–Third Edition.  
Hydrometallurgy, 4, (1979).  
Canadian Journal of Chemical Engineering, vol. 58, Oct. 1980.  
Reprint from Chemtech, vol. 9, Jul. 1979, pp. 426–427.  
Novel Method For Preparation of Nickel Hydroxide.  
Dept. of Energy, Mines & Resourses, Report MPI(O), 73–4.  
Paper entitled "Cyanide Removal From Aqueous Solutions" by J. MacLachlan.  
Paper No. 8, Treatment of Gold Mill Effluents For Removal And Recovery Or Destruction of Cyanide–A Summary of Joint Projects With Six Gold Mills by G. M. Ritcey & V. M. McNamara.

*Primary Examiner*—Thomas Wyse  
*Attorney, Agent, or Firm*—Francis J. Mulligan, Jr.; Raymond J. Kenny

[57] ABSTRACT

The cyanide content of waste waters containing the same is removed by treatment with sulfur dioxide or an alkali or alkaline earth metal sulfite or bisulfite in the presence of excess oxygen and a metal catalyst which is perferably copper.

21 Claims, No Drawings 4,537,686

CYANIDE REMOVAL FROM AQUEOUS STREAMS

This application is a continuation-in-part of U.S. patent applications Ser. Nos. 341,217 and 569,714 filed January 21, 1982 and January 10, 1984 respectively now both abandoned.

The invention is directed to a process for the removal of cyanide from aqueous solutions, such as waste waters, and more particularly, to a process which can be applied to industrial effluents containing cyanide to remove cyanide and associated ions effectively at a high reaction rate.

Cyanides are useful materials industrially and have been employed for years in fields such as electroplating of metals, gold recovery from ores, treatment of sulfide ore slurries in flotation, etc. The toxicity of cyanides is, of course, well known and control of liquid effluents from plants employing cyanides industrially have been actively explored with some success. It is now recognized that effluent waters from industrial plants should not contain cyanides at levels in excess of about 0.1 milligram per liter (ppm) upon discharge. It is known that in many installations, cyanide ion will form complexes with heavy metals $[Me(CN)_x{}^{V-}]$ and that related ionic species such as thiocyanates ($CNS^-$), cyanates ($CNO^-$) and associated species, e.g., thiosulfates ($S_2O_3{}^{--}$) may also occur in the waste waters. Processes involving the use of cyanide generate vaste quantities of water bearing cyanide and associated ions in quantities exceeding those regarded as being safe for discharge into streams. Gold mining, alone, is responsible for the generation of large amounts of cyanide laden water.

General awareness of the problem has resulted in a number of techniques for cyanide disposal in waste waters including oxidation by chemical or electrochemical means, ion exchange, and AVR (acidification-volatilization-reneutralization). These processes are operative but are accompanied by serious practical disadvantages including high costs. Thus, chemical oxidation of cyanide can be achieved with strong oxidants such as chlorine gas or hypochlorite, ozone, peroxide, peroxysulfates or oxygen in the presence of a catalyst. Alkaline chlorination is the most commonly used approach. In addition to high reagent costs, chloride ion contamination of the water being treated and potential formation of cyanogen chloride can result. Ozonation treatment of effluents is clean and efficient, but involves high initial capital costs as well as high energy cost. Peroxides and peroxysulfates are expensive reagents for cyanide oxidation in dilute water solution. Pressure oxidation using oxygen and a catalyst, such as nickel metal or activated carbon, can be employed to destroy the cyanide content of waste waters, but the reaction rates are low and the use of expensive pressure vessels is required.

Electrolytical oxidation of aqueous cyanide solutions, while being feasible, involves the use of sophisticated electrolytic cells and high capital investment.

Ion exchange offers the potential for recovering metal values and cyanide but is accompanied by the possibility of precipitation of metals within the resin bed and fouling, a high requirement for sulfuric acid, high capital cost and a hazard associated with HCN recovery. It involves sophisticated technology and careful control of a kind not customarily available at remote mine sites or in waste water treatment facilities.

The AVR approach also offers the potential for recovering cyanide through the generation of HCN vapor. This is inherently a hazardous operation in which energy requirements are high, reaction kinetics are slow and it is difficult to achieve acceptably low residual cyanide levels in the effluent.

While progress has been made in dealing with the problem, it is clear that better, cheaper, more effective methods are needed to cope with a problem having the scope of the cyanide contamination of waste waters. Thus, a process which effectively removes cyanides and associated ions from waste waters but which uses low cost reagents, has high reaction kinetics, and can be carried out in simple equipment with low capital investment and low energy requirement is needed.

BRIEF DESCRIPTION OF THE INVENTION

In accordance with the invention, free and complex cyanide species present in waste water streams are decomposed by treatment of the waste water with a mixture of sulfur dioxide and air or oxygen in the presence of a water-soluble copper catalyst. The treatment is effective at any pH in the range of about 5 to about 12, but is preferably conducted in a pH range between about 5 and 10, e.g., around 9. Removal of the free cyanide and complex metal cyanide species from waste water streams is very slow with $SO_2$ and air alone. The presence of copper catalyzes the removal of free cyanide, complex heavy metal cyanide cyanate and thiosulfate species from the stream. Once the cyanide species are removed, related species can be removed by continued treatment with sulfur dioxide and oxygen or air in the presence of a metal ion (simple or complex) such as nickel, cobalt, or manganese which then acts catalytically in the stream. The thiocyanate species is removed effectively using nickel as a catalyst with or without copper.

Control of pH is effected by any alkali or alkaline-earth metal hydroxide or carbonate. Limestone can be used in the pH range about 5 to about 6.5. Metals present in the effluents treated in accordance with the invention can be recovered as oxides or hydroxides by adjusting the pH of the treated waste water to the range of about 9 to about 10. The metal species employed as catalyst can thus be recovered and recycled, if desired.

Alkali or alkaline-earth metal sulfites (including bisulfites and metabisulfites) can be employed in place of the sulfur dioxide-air or oxygen mixture.

The process can be carries out batchwise or continuously using one or several stages, depending on the objectives with respect to species to be decomposed and metals to be recovered.

The necessary reagent can be prepared, for example by scrubbing a stack gas containing typically 0.1 to 5% $SO_2$, 1–5% $CO_2$ with lime or limestone as base to produce a suspension or slurry containing calcium sulfite or bisulfite. Alternatively, a stack gas, as before described, can be used as a primary reagent along with lime or limestone as a base. When using calcium sulfite or bisulfite, an operating pH of about 5 to about 7 is desirable, since at higher pH dissolution of calcium sulfite becomes too slow. It will be appreciated in this connection that the action of sulfur dioxide and oxygen in water solution results in the production of sulfuric acid which must be neutralized resulting in gypsum formation when lime or limestone is used as base to control pH. A low operating pH of 5 to 7 is preferred when using sparingly soluble sulfites such as calcium sulfite so as to reduce the amount of unreacted sulfite and gypsum in the metal, including gold, silver and platinum-group metal precipitates. The required amount of sulfite can be added at once and the required air or oxygen addition can be added separately. In similar fashion, (and bearing in mind the need for pH control) the required amount of sulfur dioxide can be added initially with the air or oxygen requirement added separately. At least about 2.5 grams of sulfur dioxide are required per gram of $CN^-$ to be removed; whereas at least about 4.5 grams of sulfur dioxide are required per gram of $CNS^-$ to be removed. The rate of oxygen supply can be used to control reaction kinetics.

Where recovery of high grade metal hydroxides is desired, soluble alkaline sulfites such as sodium sulfite or $SO_2$ and sodium hydroxide or carbonate can be used. Metals which can be recovered, if present in the waste water treated in accordance with the invention include copper, nickel, cobalt, zinc, cadmium, manganese, iron, arsenic, silver, gold, platinum and palladium. The presence of a small amount of xanthate in the waste water assists in gold recovery. To obtain a precipitate of metal hydroxide at the conclusion of the cyanide removal reactions the pH of the solution desirably should be elevated to the range of 9–10. When this is done precipitation of the metal hydroxide results, with high metal recoveries.

It is to be appreciated that the waste waters treated in accordance with the invention are indeed very dilute with respect to the species to be removed. Thus, with respect to the cyanide species the waters treated rarely contain more than about 1000 ppm and more ordinarily will contain no more than about 200 ppm. Cyanide species can be reduced to as low as 0.1 ppm (0.1 milligram per liter) in a very short treatment time in accordance with the invention, when a copper catalyst is co-present with the reactants sulfur dioxide and oxygen. Cyanide removal to levels well below 0.1 ppm has been achieved.

PREFERRED CONDITIONS

In removal of free cyanide and cyano-metal complexes from waste waters in accordance with the invention, the preferred ingredients are sulfur dioxide, air and lime. The temperature may be in the range of 0° to 100° C. and the operating pH about 5 to about 9 or 10. Sulfur dioxide preferably is dispersed in the water to be treated as a mixture of 0.1 to 6% by volume in air. For this purpose, reactors used in flotation technology are entirely suitable either for adding $SO_2$—air mixtures or for adding air alone to water solutions or pulps.

The catalyst for free cyanide and complex cyanide removal is copper which should be present preferably in a weight ratio of copper to total cyanide of at least about 0.25 gm/gm to obtain efficient utilization of sulfur dioxide and air, together with high reaction kinetics. Thiosulfate ion can also be removed from the solution under these preferred conditions once cyanide is removed.

In the case of thiocyanate ion removal, the same reagents are preferred using a temperature in the range of about 25° C. to 100° C. and with a pH being less than about 9. The $SO_2$ addition rate should be at least about 2 grams per liter per hour as a 0.1 to 1% volume proportion of sulfur dioxide in air. Again a metal catalyst, preferably nickel, should be present to provide high reaction kinetics.

For purposes of this specification and claims, the expression "total cyanide" used herein includes free cyanide and metal cyanide complexes. The term "metal catalyst" refers to metal in solution. Essentially water-insoluble compounds such as copper hydroxide, per se, are not effective catalysts.

Some examples will now be given.

EXAMPLE 1

This example illustrates the effect of pH in the range 6.5 to 10 on cyanide removal in cyanide-containing solution using $SO_2$ gas, air and lime. Feed solution analyzing in mg/l, $CN^-$ 164, $CNS^-$ 127, $S_2O_3^{--}$ 437, $Ni^{++}$ 71 and $Cu^+$ 34 was placed in a two liter capacity resin reaction kettle and agitated at 1,000 rpm by means of a titanium impeller. Sulfur dioxide gas, pre-mixed with air (1.2% by volume $SO_2$) was added at a constant rate of 2 g per liter of solution per hour through a fritted glass filter inlet placed adjacent to the impeller blades. The pH of the reaction mixture was controlled by addition of a one molar lime-water slurry on demand by means of a Radiometer Titrator pH controller.

Results are shown in Table I. The optimum pH for cyanide removal was around 9. At this pH, $CN^-$, $S_2O_3^{--}$, $Ni^{++}$ and $Cu^+$ in solution were all removed to relatively low values. At pH's below 9, some of the Ni remains in solution. This Ni, however, can be hydrolyzed at higher pH. At pH's above 9, longer reaction times are required and the efficiency of the reagents decreases. In all cases, $CNS^-$ decomposition was incomplete in the time allowed for the tests.

EXAMPLE 2

This example illustrates the effect of $SO_2$ addition rate on the removal of cyanide from cyanide containing water using $SO_2$, air and lime. Feed solution analyzing in mg/l, $CN^-$ 164, $CNS^-$ 127, $S_2O_3^{--}$ 437, $Ni^{++}$ 71 and $Cu^+$ 34 was placed in a two liter capacity resin reaction kettle and agitated at 1,000 rpm by means of a titanium impeller.

TABLE I

CYANIDE REMOVAL WITH $SO_2$, LIME AND AIR EFFECT OF pH

Conditions: Batch; 23° C.; $SO_2$ addition rate: 2 g/h/l; aeration rate: 60 liters/h/l; agitation: 1000 rpm (1.2% $SO_2$ in air).

Feed Liquor Analyses (mg/l): $CN^-$ 164, $CNS^-$ 127, $S_2O_3^{=}$ 437, $Ni^{++}$ 71, $Cu^+$ 34.

| Test | pH | Duration (min) | $SO_2$ Added (g/l) | Effluent Analyses (mg/l) | | | | | Reagent Consumptions (g per g $CN^-$ removed) | |
|---|---|---|---|---|---|---|---|---|---|---|
| | | | | $CN^-_{TOT}$ | $CNS^-$ | $S_2O_3^{=}$ | Ni | Cu | $SO_2$ | $Ca(OH)_2$ |
| A | 6.5* | 30 | 2.10 | 18.0 | 110 | 32 | 53.9 | 1.8 | 14.0 | 16.0 |
| B | 7.0 | 60 | 2.00 | 5.4 | 55 | 60 | 49.5 | 1.9 | 12.7 | 18.0 |
| C | 8.0 | 40 | 1.36 | 3.2 | 85 | 7 | 28.5 | 1.7 | 8.4 | 13.5 |
| D | 9.0 | 40 | 1.36 | 2.3 | 82 | 6 | 4.2 | 2.3 | 8.4 | 14.9 |

TABLE I-continued

CYANIDE REMOVAL WITH $SO_2$, LIME AND AIR EFFECT OF pH

Conditions: Batch; 23° C.; $SO_2$ addition rate: 2 g/h/l; aeration rate: 60 liters/h/l, agitation: 1000 rpm (1.2% $SO_2$ in air).

Feed Liquor Analyses (mg/l): $CN^-$ 164, $CNS^-$ 127, $S_2O_3^=$ 437, $Ni^{++}$ 71, $Cu^+$ 34.

| Test | pH | Duration (min) | $SO_2$ Added (g/l) | $CN^-_{TOT}$ | $CNS^-$ | $S_2O_3^=$ | Ni | Cu | $SO_2$ | $Ca(OH)_2$ |
|---|---|---|---|---|---|---|---|---|---|---|
| | | | | Effluent Analyses (mg/l) | | | | | Reagent Consumptions (g per g $CN^-$ removed) | |
| E | 10.0 | 100 | 3.40 | 3.9 | 78 | 41 | 3.6 | 2.4 | 21.1 | 38.6 |

*The $SO_2$ addition rate was 4 g/h/l in this test (2.4% $SO_2$ in air).

Sulfur dioxide gas was added at rates in the range 0.36 to 17 g per liter per hour, pre-mixed with air which was added at a constant rate of 60 liters per liter per hour. Therefore the $SO_2$-air mixture varied in composition from 0.2 to 10% by volume $SO_2$. The pH of the reaction mixture was maintained constant at 9 with a one molar lime-water slurry added on demand by means of a Radiometer pH controller. Results are given in Table II.

The $SO_2$ efficiency for $CN^-$ removal decreased with increasing $SO_2$ addition rate. This may be attributed to both inadequate dispersion of air and a lack of available oxygen at the higher $SO_2$ addition rates. Both $CN^-$ and $S_2O_3^{--}$ can be decomposed in the range of $SO_2$ addition rates studied. Decomposition of $SCN^-$, however, was only achieved with $SO_2$ addition rates below about 2 g per liter per hour.

EXAMPLE 3

This example shows that complete cyanide decomposition can also be attained in 40 minutes of reaction using calcium or sodium sulfite instead of sulfur dioxide gas in combination with air. In each test, 1.1 g of $SO_2$ was added slowly either as $CaSO_3$ slurry containing 18.3 g/l CaO and 22.2 g/l $SO_2$ or as $Na_2SO_3$ crystals respectively, to feed cyanide water analyzing in mg/l, $CN^-$ 110, $SCN^-$ 120, $S_2O_3^{--}$ 274, $Cu^+$ 38.4 and $Ni^{++}$ 47. The reaction mixture was then aerated at 1 liter per liter per minute and $H_2SO_4$ was added slowly to lower the pH from about 9 to 5.5. After 40 minutes the final liquor was re-neutralized with lime to pH 10 and the precipitated metal hydroxides were removed by filtration.

Results are shown in Tables III and IV.

EXAMPLE 4

An example of one stage continuous decomposition of cyanide in cyanide-bearing waste water using $SO_2$, air and lime is given in Table V. The reaction was carried out in a 450 ml capacity stirred beaker with continuous addition of pre-mixed $SO_2$ and air through a fritted glass inlet tube and lime addition on pH demand at pH 9. About 1.5 g/l of $SO_2$ was added as a 1.75% mixture in air with a solution retention time of 30 minutes. The reacted suspension was collected in beakers where the pH was adjusted to 10 with lime. Under the above conditions the concentrations of $CN^-$, $Ni^{++}$ and $Cu^+$ in solution were all lowered to below 0.5 mg/l. About 80% of the thiosulfate was decomposed. Only a minor amount of the thiocyanate was removed.

TABLE II

CYANIDE REMOVAL WITH $SO_2$, AIR AND LIME EFFECT OF $SO_2$ ADDITION RATE AND TIME

Conditions: Batch, 23° C., pH 9; aeration rate: 60 liters/h/l; agitation: 1000 rpm
Feed Liquor Analyses (mg/l): $CN^-$ 164, $CNS^-$ 127, $S_2O_3^=$ 437, $Ni^{++}$ 71, $Cu^+$ 34

| Test | $SO_2$ Addition Rate (g/h/l) | $SO_2$ In Air % | Duration (min) | $SO_2$ Added (g/l) | $CN^-_{TOT}$ | $CNS^-$ | $S_2O_3^=$ | Ni | Cu | $SO_2$ | $Ca(OH)_2$ |
|---|---|---|---|---|---|---|---|---|---|---|---|
| F | 0.36 | 0.2 | 150 | 0.90 | 1.4 | 100 | 18 | 1.9 | 0.3 | 5.3 | 10 |
| | | | 300 | 1.80 | 3.5 | 2 | 9 | 2.1 | 0.2 | 10.7 | 20 |
| G | 1.15 | 0.6 | 55 | 1.05 | 3.0 | 67 | 7 | 7.3 | 0.8 | 6.8 | 14 |
| | | | 105 | 2.00 | 1.0 | 1 | 1 | 6.5 | 0.3 | 12.2 | 25 |
| D | 2.04 | 1.2 | 40 | 1.36 | 2.3 | 82 | 6 | 4.2 | 2.3 | 8.4 | 15 |
| | | | 100 | 3.40 | 5.4 | 19 | 17 | 2.4 | <0.01 | 21.3 | 38 |
| H | 4.26 | 2.5 | 20 | 1.42 | 1.5 | 81 | 7 | 3.0 | 2.0 | 8.7 | 13 |
| | | | 50 | 3.55 | 2.3 | 75 | 19 | 6.3 | 0.2 | 21.8 | 32 |
| I | 8.56 | 5.0 | 15 | 2.14 | 2.5 | 66 | 7 | 0.7 | 9.6 | 13 | 26 |
| | | | 30 | 4.29 | 2.4 | 52 | 33 | 6.8 | 0.3 | 31 | 62 |
| J | 17.10 | 10 | 6 | 1.71 | <10 | 131 | 120 | 43 | 20 | ~11 | 23 |
| | | | 10 | 2.85 | <2 | 103 | 65 | 23 | 15 | 17 | 39 |

TABLE III

CYANIDE DECOMPOSITION WITH SODIUM SULFITE AND AIR

Conditions: 1.1 g $SO_2$ was added as $Na_2SO_3$ per liter of effluent; $H_2SO_4$ was added slowly to lower the pH to about 5.5, with aeration at 1 liter/min/l. The final liquor, after 40 minutes, was re-limed to pH 10 and the metal hydroxides were removed by filtration.

| Stream | Analyses (mg/l) or (wt. %) | | | | | Distributions (%) | | | | |
|---|---|---|---|---|---|---|---|---|---|---|
| | $CN^-_{TOT}$ | $SCN^-$ | $S_2O_3^=$ | Cu | Ni | $CN^-$ | $CNS^-$ | $S_2O_3^=$ | Cu | Ni |
| Feed | 110 | 120 | 274 | 38.4 | 47.0 | 100 | 100 | 100 | 100 | 100 |
| Treated Liquor | 0.1 | 113 | 40 | 1.1 | 1.1 | 0.1 | 94 | 14 | 28 | 2.3 |
| Precipitate | — | — | — | 18.8 | 22.4 | — | — | — | 97.2 | 97.7 |

TABLE IV

CYANIDE DECOMPOSITION WITH CALCIUM SULFITE AND AIR

Condition: 1.1 g $SO_2$ was added as $CaSO_3$ (18.3 g/l CaO, 22.2 g/l $SO_2$) per liter of effluent; $H_2SO_4$ was added slowly to lower the pH to about 5.5, with aeration at 1 l/min/l. The final liquor was re-limed to pH 10 and the metal hydroxides were removed by filtration.

| Stream | Analyses (mg/l) or (wt. %) | | | | | Distributions (%) | | | | |
|---|---|---|---|---|---|---|---|---|---|---|
| | $CN^-_{TOT}$ | $SCN^-$ | $S_2O_3^=$ | Cu | Ni | $CN^-$ | $SCN^-$ | $S_2O_3^=$ | Cu | Ni |
| Feed | 110 | 120 | 274 | 38.4 | 47.0 | 100 | 100 | 100 | 100 | 100 |
| Treated Effluent | 0.1 | 124 | 36 | 0.4 | 1.0 | 0.1 | 100 | 13 | 1.0 | 2.1 |
| Precipitate | — | — | — | 13.2 | 15.9 | — | — | — | 99.0 | 97.9 |

TABLE V

ONE STAGE CONTINUOUS CYANIDE DECOMPOSITION USING SULFUR DIOXIDE, LIME AND AIR

Condition: $SO_2$ addition rate: 1.05 l/h/l
22° C., 1000 rpm; pH 9; aeration rate 60 l/h/l; retention time 30 minutes; effluent was limed to pH 10 and the metal hydroxide precipitate was settled and filtered.

| Stream | Analyses (mg/l) or (wt. %) | | | | | Distributions (%) | | | | |
|---|---|---|---|---|---|---|---|---|---|---|
| | $CN^-_{TOT}$ | $SCN^-$ | $S_2O_3^=$ | Ni | Cu | $CN^-$ | $SCN^-$ | $S_2O_3^=$ | Ni | Cu |
| Feed | 150 | 198 | 174 | 79 | 45 | 100 | 100 | 100 | 100 | 100 |
| Treated Effluent | <0.3 | 184 | 33 | 0.3 | 0.1 | <0.2 | 93 | 20 | 0.4 | 0.2 |
| Precipitate | 0 | — | — | 2.6 | 1.5 | — | — | — | 99.6 | 99.8 |

Decomposition of $CNS^-$ species would require longer retention time and higher pH to be completed.

EXAMPLE 5

An example of a two stage continuous treatment of cyanide containing effluent using synthetic stack gas (0.6% $SO_2$, 1% $CO_2$ and air) and lime at 24° C. is shown in Table VI. The bulk of the cyanide is decomposed in the first stage with a solution retention time of 4.6 minutes and an addition of stack gas of 40.6 liter per liter of solution, maintaining the pH at 6.5 to 7.0 with lime. The remaining cyanide is decomposed in the second oxidation stage with a solution retention time of 2.8 minutes and a stack gas addition of 24.8 liter per liter of solution treated, maintaining the pH at 6.5 with lime. The treated effluent is then neutralized with lime to pH 10 and filtered to recover the precipitated metal hydroxides. The above treatment leads to complete cyanide destruction, recovery of all dissolved Ni and Cu in a high grade precipitate at approximately 20% Ni+Cu by weight and recovery of part of the Pt and Pd and 80% of the Ag in the precipitate. Gold was not recovered in this particular test. Most of the thiosulfate but none of the thiocyanate is removed under the above reaction conditions.

EXAMPLE 6

Examples given in Table VII illustrate the effect of temperature on the decomposition of cyanide species and thiosulfate. The tests were carried out batchwise using synthetic stack gas containing 0.6% $SO_2$, 1% $CO_2$ in air and lime for pH control. The examples of tests 2, 3 and 4 indicate that temperature does not affect the removal efficiency of toxic cyanide species over the temperature range investigated, at pH 9, but affects the efficiency of thiocyanate and thiosulfate removal. Almost no thiocyanate is decomposed at 1° C. Examples of tests 1 and 2 show that at 1° C., cyanide species and thiosulfate are removed more efficiently at pH 9 than at pH 5.

EXAMPLE 7

Examples illustrating the effect of copper on decomposition of cyanide species and thiosulfate are given in Table VIII. With no copper present, cyanide was removed at a very slow rate (Test C-1, C-3, C-4 and C-6).

TABLE VI

TWO STAGE CONTINUOUS CYANIDE REMOVAL USING STACK GASES

| Conditions: | Reactor I: | 24° C., 4.6 minutes retention, pH 6.5–7.0, 41 l (air + 0.6% $SO_2$ + 1% $CO_2$) per l of feed. |
|---|---|---|
| | Reactor II: | 24° C., 2.8 minutes retention, pH 6.5, 25 l (air + 0.6% $SO_2$ + 1% $CO_2$) per l of feed. |
| | Overflow: | 24° C., limed to pH 10, settled and filtered. |

| Stream | Analyses (mg/l) or (wt. %) | | | | | | | | |
|---|---|---|---|---|---|---|---|---|---|
| | $CN^-_{TOT}$ | $SCN^-$ | $S_2O_3^=$ | Cu | Ni | Pt | Pd | Au | Ag |
| Feed (pH 9.5) | 116 | 117 | 242 | 36 | 47 | 0.072 | 0.082 | 0.020 | 0.139 |
| Reactor I Effluent | 9.9 | 117 | 36 | 13 | 0.2 | — | — | — | — |
| Final Effluent | 0.6 | 115 | 27 | 0.2 | 0.2 | 0.041 | 0.032 | 0.020 | 0.019 |
| Precipitate | 0 | 0 | 0 | 7.9 | 10.5 | 0.006 | 0.006 | 0 | 0.0254 |

| P.M.'s AND METAL RECOVERIES | | | | | |
|---|---|---|---|---|---|
| (%) | | | | | |
| Cu | Ni | Pt | Pd | Au | Ag |
| 99.4 | 99.6 | 43 | 39 | 0 | 86 |

TABLE VII
EFFECT OF TEMPERATURE

Conditions: Batch, $SO_2$ added as simulated stack gas (0.6% $SO_2$, 1% $CO_2$, air) at rate of 0.86 g/l/h (Tests 1, 2 and 4) and of 0.34 g/l/h (Test 3); lime as base.

| Test | Stream | Time (min) | T (°C.) | pH | $SO_2$ Added (g/l) | $CN^-_{TOT}$ | $SCN^-$ | $S_2O_3^=$ | Cu | Ni |
|---|---|---|---|---|---|---|---|---|---|---|
| 1 | Feed | 0 | 1 | 9.5 | 0 | 173 | 410 | 350 | 24 | 64 |
|   | Effluent | 240 | 1 | 5 | 3.4 | 1.7 | 376 | 170 | 14 | 2 |
|   | Effluent | 300 | 1 | 5 | 4.3 | 0.2 | 364 | 63 | 4 | 23 |
| 2 | Feed | 0 | 1 | 9.5 | 0 | 173 | 398 | 368 | 26 | 73 |
|   | Effluent | 60 | 1 | 9 | 0.86 | 0.8 | 372 | 215 | 24 | 62 |
|   | Effluent | 300 | 1 | 9 | 4.3 | 0.3 | 313 | 36 | 0.3 | 1.8 |
| 3 | Feed | 0 | 24 | 9.5 | 0 | 162 | 231 | 224 | 29 | 79 |
|   | Effluent | 150 | 24 | 9 | 0.85 | 1.4 | 182 | 18 | 0.3 | 1.9 |
|   | Effluent | 300 | 24 | 9 | 1.7 | 3.5 | 2 | 9 | 0.2 | 2.1 |
| 4 | Feed | 0 | 24 | 9.5 | 0 | 173 | 381 | 224 | 28 | 104 |
|   | Effluent | 60 | 50 | 9 | 0.86 | 0.8 | 371 | 18 | 0.6 | 0.5 |
|   | Effluent | 180 | 50 | 9 | 2.6 | 0.6 | 2 | <5 | 0.3 | 0.4 |

TABLE VIII
EFFECT OF COPPER

Conditions: Batch, 22–23° C., pH 9, $SO_2$ addition rate of 4.3 g/l/h, air addition rate of 60 liters/l/h.

| Test | Stream | Time (min) | $SO_2$ Added (g/l) | $CN^-_{TOT}$ | $SCN^-$ | $S_2O_3^=$ | Cu | Ni |
|---|---|---|---|---|---|---|---|---|
| C-1 | Feed | 0 | 0 | 178 | 0 | 0 | 0 | 0 |
|     | Effluent | 40 | 2.9 | 100 | 0 | 0 | 0 | 0 |
| C-2 | Feed | 0 | 0 | 218 | 0 | 0 | 87 | 0 |
|     | Effluent | 20 | 1.4 | 0.4 | 0 | 0 | 2.8 | 0 |
| C-3 | Feed | 0 | 0 | 239 | 0 | 0 | 0 | 49 |
|     | Effluent | 40 | 2.9 | 190 | 0 | 0 | 0 | 49 |
| C-4 | Feed | 0 | 0 | 150 | 164 | 330 | 0 | 0 |
|     | Effluent | 50 | 3.6 | 99 | 200 | 212 | 0 | 0 |
| C-5 | Feed | 0 | 0 | 150 | 153 | 362 | 21 | 0 |
|     | Effluent | 85 | 6 | 0.5 | 195 | 3 | 0.2 | 0 |
| C-6 | Feed | 0 | 0 | 160 | 156 | 352 | 0 | 74 |
|     | Effluent | 50 | 3.6 | 120 | 129 | 242 | 0 | 67 |
| C-7 | Feed | 0 | 0 | 150 | 154 | 341 | 19 | 79 |
|     | Effluent | 50 | 3.6 | 55 | 127 | 132 | 14 | 36 |
| C-8 | Feed | 0 | 0 | 200 | 173 | 350 | 40 | 77 |
|     | Effluent | 33 | 2.4 | 0.5 | 112 | 77 | 0.2 | 2.5 |
|     | Effluent | 50 | 3.6 | 1 | 1 | 1 | 0.1 | 2.0 |

The examples of tests C-2 and C-5 show that copper acts as a catalyst not only for $CN^-$ removal, but also for thiosulfate decomposition. The tests show that copper is a catalyst for $CN^-$ and $S_2O_3^{--}$ decomposition (C-5), while nickel acts as a catalyst for the removal of thiocyanate once $CN^-$ has been removed (C-8).

EXAMPLE 8

Examples illustrating removal of cyanide from gold mill effluents are shown in Table IX. As can be seen all species except $SCN^-$ were decomposed and all metal values were hydrolyzed out of solution, including Zn, Fe and As. In all cases, Cu was present initially.

EXAMPLE 9

This example illustrates removal of cyanide from zinc effluent. As can be seen, $CN^-$ removal was very slow and inefficient in the absence of added copper (Test P-1). In the presence of some copper (Cu/CN- -tot=0.075) removal of $CN^-$ was complete in one hour. In addition, iron was removed to a very low level of 0.01 mg/l.

EXAMPLE 10

This example illustrates the catalytic effect of some metals in the decomposition of thiosulfate in thiosulfate-containing effluents using $SO_2$, air and lime (Table XI). In the absence of metal, decomposition of $S_2O_3^{--}$ is slow (Test S-1). Of the metals tested, copper was the best (Test S-2), and nickel had no catalytic effect (Test S-3). Cobalt, although present as a precipitate at pH 9, also acts as a catalyst for $S_2O_3^{--}$ decomposition (Test S-4). Both iron and manganese have some catalytic effect on $S_2O_3^{--}$ decomposition at pH 4 and 6 respectively, but no catalytic effect of manganese was observed at pH 9 (Tests S-5, S-6 and S-7).

EXAMPLE 11

Examples of cyanide removal from effluents also containing between 15 and 62% by weight solids (mainly pyrrhotite-iron sulfide) using $SO_2$, air and lime are shown in Table XII. No $CN^-$ is decomposed in the absence of copper addition (Test P-4). In this case, a large amount of thiosulfate is produced through oxidation of the pyrrhotite. The examples of Tests P-1, P-2 and P-3 indicate that $CN^-$, complexed metal cyanide and $S_2O_3^{--}$ are all decomposed when adding a $CuSO_4$ solution continuously during the treatment with $SO_2$, air and lime.

TABLE IX
CYANIDE REMOVAL FROM SIMULATED GOLD MILL EFFLUENT

Conditions: Batch 22° C., pH 9, air addition rate of 60 liters/h/l, lime as base.
$SO_2$ addition rate: Test G-6: 1.7 g/l/h; Test G-1, 2, 3, 4: 4.2 g/l/h; Test G-5: 8.4 g/l/h.

| Test | Time (min) | $SO_2$ Added (g/l) | $CN^-_{TOT}$ | $SCN^-$ | $S_2O_3^=$ | Cu | Ni | Zn | Fe | As |
|---|---|---|---|---|---|---|---|---|---|---|
| G-1 | 0 | 0 | 360 | 381 | 462 | 81 | 5.2 | 68 | 5.9 | N.D. |

TABLE IX-continued

CYANIDE REMOVAL FROM SIMULATED GOLD MILL EFFLUENT

Conditions: Batch 22° C., pH 9, air addition rate of 60 liters/h/l, lime as base.
SO$_2$ addition rate: Test G-6: 1.7 g/l/h; Test G-1, 2, 3, 4: 4.2 g/l/h;
Test G-5: 8.4 g/l/h.

| Test | Time (min) | SO$_2$ Added (g/l) | CN$^-_{TOT}$ | SCN$^-$ | S$_2$O$_3^=$ | Cu | Ni | Zn | Fe | As |
|---|---|---|---|---|---|---|---|---|---|---|
| | 30 | 2.15 | 190 | 369 | 110 | 80 | 5.3 | 66 | 3.3 | — |
| | 50 | 3.60 | <1 | 352 | 13 | 7 | 0.5 | 1.1 | 0.1 | — |
| | 100 | 7.20 | <0.5 | 2 | 7 | 0.1 | 0.3 | 1.0 | 1.2 | — |
| | 110 | 7.9 | <0.5 | 2 | 7 | 0.1 | 0.1 | 0.2 | 1.2 | — |
| G-2 | 0 | 0 | 50 | 102 | 110 | 25.9 | 13.6 | 1.3 | 0.14 | N.D. |
| | 10 | 0.70 | 0.5 | 75 | 5 | 4.2 | 1.4 | N.D. | N.D. | — |
| | 15 | 1.05 | 1.0 | 47 | 8 | 0.3 | 0.7 | N.D. | N.D. | — |
| G-3 | 0 | 0 | 754 | 876 | 325 | 106 | 112 | 41.8 | 0.6 | N.D. |
| | 40 | 2.80 | 498 | — | — | 96 | 103 | 36.6 | 0.6 | — |
| | 60 | 4.20 | 160 | — | — | 75 | 50 | 1.0 | 0.2 | — |
| | 70 | 4.90 | 1.6 | — | — | 1.4 | 2 | 0.4 | 0.2 | — |
| | 80 | 5.60 | 1.2 | 672 | 10 | 0.6 | 2 | 0.4 | 0.2 | — |
| G-4 | 0 | 0 | 1190 | 796 | — | 488 | 5.6 | 28.6 | 1.2 | N.D. |
| | 30 | 2.10 | 344 | — | — | 395 | 5.8 | 6.6 | 0.2 | — |
| | 40 | 2.80 | 4 | 460 | — | 22 | 0.8 | 3.0 | 0.2 | — |
| G-5 | 0 | 0 | 554 | — | — | 140 | 9.6 | 100 | 30.6 | 10.5 |
| | 20 | 2.80 | 220 | — | — | 110 | 8.4 | 1.6 | 0.5 | 2.1 |
| | 25 | 3.50 | <1 | — | — | 19.3 | 0.9 | 1.0 | <0.2 | <0.1 |
| | 30 | 4.20 | <1 | — | — | 3.3 | 0.9 | 0.8 | <0.2 | <0.2 |
| | 40 | 5.60 | <1 | — | — | 1.0 | 0.8 | 0.8 | <0.2 | <0.1 |
| G-6 | 0 | 0 | 225 | 390 | 232 | 48.3 | 1.6 | 5.5 | 95 | N.D. |
| | 20 | 0.56 | 204 | 350 | — | 48.3 | 1.40 | 5.6 | 92 | — |
| | 40 | 1.12 | 31 | — | — | 14.0 | 0.80 | 4.8 | 60 | — |
| | 50 | 1.41 | 0.2 | — | — | 1.0 | 0.40 | <0.4 | 2.4 | — |
| | 60 | 1.70 | 0.06 | 336 | <0.5 | 1.0 | <0.40 | <0.4 | 0.9 | — |

NOTE:
N.D. = 0.01 mg/l

TABLE X

CYANIDE REMOVAL IN ZINC PLATING EFFLUENT

Conditions: 23° C. batch, SO$_2$ addition rate (4.2 g/l/h), pH 9; catalyst: Cu as CuCl$^-$
feed composition; (mg/l): 350 CN$^-$, 295 Zn, 25.9 Fe, no Cu, no SCN$^-$,
no S$_2$O$_3^=$.

| Test | Time (min) | pH | CN$^-$ | Zn | Fe | Cu | SO$_2$ Added (g/l) | SO$_2$ Consumption (g per g CN$^-$ removed) |
|---|---|---|---|---|---|---|---|---|
| P-1 | 0 | 12.9 | 400 | 295 | 25.9 | 0 | 0 | — |
| | 20 | 12.0 | 325 | 200 | 24.2 | 0 | 1.6 | 21.3 |
| | 30 | 9.0 | 285 | 156 | 0.1 | 0 | 2.1 | 18.3 |
| | 60 | 9.0 | 255 | 170 | 5.4 | 0 | 4.2 | 29.0 |
| P-2 | 0 | 12.8 | 400 | 297 | 26.4 | 30.3 | 0 | — |
| | 10 | 12.4 | 100 | 6.8 | 23.8 | 3.8 | 0.7 | 2.3 |
| | 20 | 11.7 | 33 | 0.5 | 20.9 | 2.7 | 1.4 | 3.8 |
| | 40 | 9.0 | 5 | 0.3 | 3.0 | 1.8 | 2.8 | 7.0 |
| | 60 | 9.0 | 0.5 | 1.7 | 0.01 | 2.0 | 4.2 | 10.5 |

TABLE XI

CATALYTIC DECOMPOSITION OF THIOSULFATE USING SO$_2$, AIR AND LIME

Conditions: Batch, 22–23° C., pH controlled with lime,
addition of 4.2 g SO$_2$ per l/per h,
air addition at 80 liters/h/l.

| Test | Time (min) | SO$_2$ Added (g/l) | pH | S$_2$O$_3^=$ (mg/l) | Type* | Catalyst Amount in Solution (mg/l) |
|---|---|---|---|---|---|---|
| S-1 | 0 | 0 | 9.0 | 301 | None | 0 |
| | 40 | | 9.0 | 240 | — | 0 |
| S-2 | 0 | 0 | 9.0 | 320 | Cu | 33 |
| | 20 | 1.40 | 9.0 | 34 | | 0.6 |
| S-3 | 0 | 0 | 9.0 | 378 | Ni | 45 |
| | 40 | 2.80 | 9.0 | 350 | | 0.2 |
| S-4 | 0 | 0 | 9.0 | 373 | Co | 0.5 |
| | 40 | 2.80 | 9.0 | 1 | | 0.2 |
| S-5 | 0 | 0 | 5.6 | 456 | Fe | — |
| | 60 | 1.13 | 4.0 | 157 | | — |
| S-6 | 0 | 0 | 6.0 | 431 | Mn | — |
| | 60 | 1.13 | 6.0 | 161 | | — |
| S-7 | 0 | 0 | 9.0 | 373 | Mn | N.D. |
| | 40 | 2.80 | 9.0 | 310 | | N.D. |

*50 mg/l of metal catalyst was added as metal sulfate.

TABLE XII
CYANIDE REMOVAL FROM EFFLUENT IN THE PRESENCE OF SULFIDES (PYRRHOTITE:FeS)

Conditions: Batch, 22-23° C., pH 8 controlled with lime, $SO_2$ addition rate; 2.1 or 4.2 g/l/h; air addition rate: 60 liters/h/l; copper addition on a continuous basis as $CuSO_4$ solution.

| Test | Solids (Weight) % | Time (min) | $SO_2$ Added (g/l) | Cu Added as $CuSO_4$ (mg/l) | $CN^-_{TOT}$ | $SCN^-$ | $S_2O_3^=$ | Cu | Ni | Fe |
|---|---|---|---|---|---|---|---|---|---|---|
| P-1 | 15.3 | 0 | 0 | 0 | 160 | 61 | 80 | 5.9 | 56.1 | 1.1 |
|  |  | 20 | 1.4 | 50 | 41 | 54 | 23 | 18.7 | 36.3 | 0.2 |
|  |  | 25 | 1.7 | 64 | 1 | 50 | 4 | 2.5 | 15.4 | 1.0 |
|  |  | 60 | 4.2 | 156 | 1 | 48 | 2 | 0.7 | 2.7 | 0.2 |
| P-2 | 15.3 | 0 | 0 | 0 | 145 | 60 | 76 | 5.6 | 56.1 | 1.3 |
|  |  | 40 | 2.8 | 26 | 92 | 60 | 25 | 15.4 | 45.1 | 0.2 |
|  |  | 50 | 3.5 | 32 | 1 | 53 | 6 | 2.6 | 17.6 | 0.2 |
|  |  | 60 | 4.2 | 39 | 1 | 50 | 8 | 0.3 | 6.2 | 0.2 |
| P-3 | 61.8 | 0 | 0 | 0 | 152 | 452 | 457 | 11.9 | 29.7 | 10.6 |
|  |  | 40 | 1.4 | 112 | 8 | 400 | 62 | 14.3 | 10.1 | 0.7 |
|  |  | 60 | 2.1 | 164 | 0.8 | 372 | 33 | 0.8 | 2.3 | 0.5 |
| P-4 | 61.8 | 0 | 0 | 0 | 113 | 350 | 480 | 17.1 | 33.0 | 13.1 |
|  |  | 60 | 2.1 | 0 | 113 | 436 | 1182 | 0.9 | 47.3 | 0.4 |

In the presence of 15.3% solids, about 0.25 grams of copper per gram of $CN^-$ is required and in the presence of 61.8% solids, about 1 gram of copper per gram of $CN^-$ is required.

EXAMPLE 12

An example of a two stage continuous treatment of gold mill effluent liquor using $SO_2$, air and lime at pH 9 and at 23° C. is shown in Table XIII. The bulk of the cyanide is decomposed in the first stage with a solution retention time of 9 minutes and an addition of 0.67 g $SO_2$ per liter of feed. The remaining cyanide is oxidized in the second stage with a solution retention time of 9 minutes and an addition of 0.33 g $SO_2$ per liter of feed. The treated effluent at pH 9 is neutralized with lime to pH 10 and filtered to recover the precipitated metal hydroxides. The precipitate analyzed 31% Ni+Cu+Fe+Zn+As by weight.

EXAMPLE 13

This example illustrates the beneficial effect of recycling precipitated metal hydroxide solids upon the removal of cyanide from cyanide waste waters. Results are given in Table XIV. Batch treatment of the feed cyanide liquor with $SO_2$, air and lime at 23° C. and pH 9 in the absence of metal hydroxide solids required 115 minutes to remove the cyanide from 334 mg/l down to 0.5 mg/l. The metal hydroxide precipitate resulting from this experiment was settled and was added as underflow slurry (5% of feed volume) to fresh feed. The feed cyanide liquor containing the metal hydroxides was treated with $SO_2$, air and lime at 23° C. and pH 9. In this instance, cyanide was removed from 335 mg/l to ~0.5 mg/l in 20 minutes.

EXAMPLE 14

This example illustrates treatment of cyanide containing effluents with either $Na_2SO_3$ or $CaSO_3$ without artificial aeration, depending on oxygen absorption through the surface of a quiescent liquor. In these experiments 1 l portion of solution analyzing in mg/l: $CN_{TOT}^-$68, Cu8, Ni7.5, Fe8 and Zn7.5 were treated with 0.5 g of $SO_2$ added respectively as $Na_2SO_3$ and a $CaSO_3$ suspension, at 23° C. The pH of the cyanide solution after addition of the $SO_2$ was about 9.3 in each case. The solution was left standing, open to the air and the assays shown in Table XV were obtained.

TABLE XIII
TWO STAGE CONTINUOUS CYANIDE REMOVAL FROM GOLD MILL EFFLUENT LIQUOR

Conditions:
- Stage I: 23° C., 9 minutes retention, $SO_2$: 0.67 g per l of feed, pH 9, 9 l air per l of feed.
- Stage II: 23° C., 9 minutes retention, $SO_2$: 0.33 g per l of feed, pH 9, 4.5 l air per l of feed.
- Hydrolyzer: 23° C., 36 minutes retention, pH 10.

| Stream | Analyses (mg/l) or (wt. %) | | | | | | | Reagent Consumption (g/g $CN^-_{TOT}$) | |
|---|---|---|---|---|---|---|---|---|---|
|  | $CN^-_{TOT}$ | $SCN^-$ | Cu | Ni | Fe | Zn | As | $SO_2$ | Lime |
| Feed Liquor | 220 | 230 | 64.0 | 13 | 8 | 21 | 1 | — | — |
| Stage I Effluent | 6.5 | 192 | 17.4 | 1.6 | 0.2 | 0.4 | — | 3.05 | 4.30 |
| Stage II Effluent | <0.5 | 205 | 1.0 | 1.2 | 0.2 | 0.4 | — | 1.50 | 2.14 |
| Final Effluent | 0.3 | 200 | 1.6 | 0.4 | 0.2 | 0.2 | <0.008 | 0 | 0.10 |
| Precipitate | — | — | 18.8 | 3.45 | 2.23 | 6.47 | 0.39 | — | — |

TABLE XIV
CYANIDE REMOVAL FROM WASTE WATER USING $SO_2$, AIR AND LIME. EFFECT OF RECYCLING METAL HYDROXIDE PRECIPITATE

Conditions: Batch, 23° C., $SO_2$: 4.2 g/l/h, Air: 60 liters/h/l, 1 l of solution.
Test A: No solids
Test B: Precipitate from Test A added to feed of Test B.

| Test | Time (min) | Analysis (mg/l) | | | | | $SO_2$ Consumption (g/g $CN^-_{TOT}$) |
|---|---|---|---|---|---|---|---|
|  |  | $CN^-_{TOT}$ | Cu | Ni | Fe | Zn |  |
| A | 0 | 334 | 24.2 | 4.6 | 45.1 | 108 |  |

TABLE XIV-continued

CYANIDE REMOVAL FROM WASTE WATER USING
SO$_2$, AIR AND LIME.
EFFECT OF RECYCLING METAL
HYDROXIDE PRECIPITATE

Conditions: Batch, 23° C., SO$_2$: 4.2 g/l/h, Air:
60 liters/h/l, 1 l of solution.
Test A: No solids
Test B: Precipitate from Test A
added to feed of Test B.

| Test | Time (min) | CN$^-_{TOT}$ | Cu | Ni | Fe | Zn | SO$_2$ Consumption (g/g CN$^-_{TOT}$) |
|---|---|---|---|---|---|---|---|
|   | 100 | 60 | 19.8 | 3.6 | 2.6 | 14.3 |  |
|   | 115 | 0.5 | 0.2 | 0.4 | 1.2 | 0.2 | 24.1 |
| B | 0 | 335 | 51.0 | 8.2 | 81.0 | 168 |  |
|   | 20 | <0.5 | 0.8 | 0.4 | 0.2 | 1 | 4.2 |

After 4 days, all CN$^-$ was removed in both cases. The removal is faster in the presence of Na$_2$SO$_3$ then in the presence of CaSO$_3$.

EXAMPLE 15

This example illustrates the treatment of effluent with SO$_2$, air and lime at 23° C. and pH 9 to remove CN$_{TOT}^-$, followed by chlorination at pH 11 to remove SCN$^-$. Results are shown in Table XVI. In another test the same effluent has been subjected only to alkaline chlorination and chlorine consumption was approximately double, while cyanide removal was incomplete, due to the stability of ferrocyanide.

EXAMPLE 16

This example illustrates treatment of cyanide containing slurry effluent with Na$_2$SO$_3$ without artificial aeration, depending on oxygen absorption through the surface of a quiescent liquor. In the experiment, 1 l of slurry containing 35% by weight sulfidic solids and analyzing in mg/l: CN$_{TOT}$440, and Cu292 was treated with 5 g of SO$_2$ added as Na$_2$SO$_3$ at 23° C. The slurry was left standing, open to the air and assays shown in Table XVII were obtained.

EXAMPLE 17

An example of a two stage continuous treatment of gold mill effluent using SO$_2$ air and lime at pH 9 and 23° C. is shown in Table XVIII. The bulk of the cyanide is removed in the first stage from which the effluent is filtered to separate the solids. The filtrate is then treated in a second stage to achieve final cyanide removal (polishing stage). The above approach yields a high grade metal hydroxide precipitate and low reagent consumption.

EXAMPLE 18

This example illustrates the removal of cyanide from dilute cyanide waste waters with pre-addition of SO$_2$ at pH 9, followed by aeration. The SO$_2$ was introduced in the waste water as a 2.5 volume % mixture in nitrogen. After SO$_2$ addition, the cyanide was analyzed at <0.5 mg/l, suggesting that very little air is required for the removal of low levels cyanide from effluents (air initially present in the water may be sufficient).

TABLE XV

CYANIDE REMOVAL FROM CYANIDE LIQUORS
Na$_2$SO$_3$ OR CaSO$_3$ WITHOUT AIR SPARGING

Conditions: 23° C., 1 liter of feed analyzing in mg/l:
CN$^-_{TOT}$ 68, SCN$^-$ 40, Cu 8, Ni 7.5, Fe 8 and Zn 7.5;
SO$_2$ added as Na$_2$SO$_3$ or CaSO$_3$ slurry
(equivalent to 0.5 g SO$_2$ per liter of solution treated).

| Time (Hours) | Test with Na$_2$SO$_3$ | | Test with CaSO$_3$ | |
|---|---|---|---|---|
|  | CN$^-_{TOT}$ | Fe | CN$^-_{TOT}$ | Fe |
| 0 | 68 | 8 | 68 | 8 |
| 24 | 34 | 8 | 45 | 8 |
| 48 | 22 | 8 | 34 | 7 |
| 96 | <0.05 | <0.5 | 0.3 | <0.5 |

TABLE XVI

CYANIDE REMOVAL FROM EFFLUENT WITH SO$_2$,
AIR AND LIME FOLLOWED BY ALKALINE
CHLORINATION FOR THIOCYANATE REMOVAL

Conditions: Step 1: 23° C., pH 9, SO$_2$: 4.2 g/l/h, air 60 liters/h/l.
Step 2: 23° C., pH 11, Cl$_2$: 4.8 g/l/h.

| Time (min) | SO$_2$ Added (g/l) | Cl$_2$ Added (g/l) | CN$^-_{TOT}$ | SCN$^-$ | Cu | Ni | Fe | Zn |
|---|---|---|---|---|---|---|---|---|
| 0 | 0 | 0 | 220 | 230 | 71 | 14.3 | 7.2 | 23.1 |
| 10 | 0.70 | 0 | 26 | 205 | 44 | 4.8 | 0.4 | 0.4 |
| 15* | 1.05 | 0 | 0.5 | 180 | 1.2 | 1.0 | 0.2 | 0.2 |
| 25 | — | 0.80 | <0.5 | 34 | — | — | — | — |
| 30 | — | 1.20 | <0.5 | 1 | — | — | — | — |

*Metal hydroxide precipitate was filtered off.

TABLE XVII

CYANIDE REMOVAL FROM
CYANIDE TAILING SLURRY WITH
Na$_2$SO$_3$ WITHOUT AIR SPARGING

Conditions: 23° C., 1 liter of feed analyzing in mg/l:
CN$^-_{TOT}$ 440, SCN$^-$ 372, S$_2$O$_3$$^=$ 208, Cu 292, Ni 1,
Zn 2 and Fe 4.7, 35% solids (sulfides).

| Time (days) | pH | Effluent Analysis (mg/l) | |
|---|---|---|---|
|  |  | CN$^-_{TOT}$ | Cu |
| 0 | 9.2 | 440 | 292 |
| 1 | 9.8 | ~150 | 210 |
| 7 | 9.8 | 4.6 | 20 |
| 9 | 9.8 | 1.1 | 5.2 |
| 12 | 9.8 | 0.6 | 1.6 |

TABLE XVIII

TWO STAGE CONTINUOUS CYANIDE REMOVAL FROM
GOLD MILL EFFLUENT LIQUOR WITH INTERMEDIATE FILTRATION

Conditions: Stage I: 23° C., 22 minutes retention, SO$_2$: 1.68 g per l of feed, pH 9,
30 l air per l of feed, filtration.
Stage II: 23° C., 7.5 minutes retention, SO$_2$: 0.14 g per l of feed, pH 9,
5 l air per l of feed.

| Stream | Analyses (mg/l) or (wt. %) | | | | | | Reagent Consumptions (g/g CN$^-_{TOT}$) | |
|---|---|---|---|---|---|---|---|---|
|  | CN$^-_{TOT}$ | SCN$^-$ | Cu | Ni | Fe | Zn | SO$_2$ | Lime |
| Feed Liquor | 500 | 279 | 60 | 58 | 72 | 50 | — | — |
| Stage I Effluent | 8.4 | 237 | 13.4 | 5.6 | 2.6 | <0.2 | 3.36 | 4.96 |
| Precipitate | — | — | 5.56 | 6.60 | 9.0 | 6.25 | — | — |

TABLE XVIII-continued
TWO STAGE CONTINUOUS CYANIDE REMOVAL FROM GOLD MILL EFFLUENT LIQUOR WITH INTERMEDIATE FILTRATION Conditions: Stage I: 23° C., 22 minutes retention, $SO_2$: 1.68 g per l of feed, pH 9, 30 l air per l of feed, filtration.
Stage II: 23° C., 7.5 minutes retention, $SO_2$: 0.14 g per l of feed, pH 9, 5 l air per l of feed.

| Stream | Analyses (mg/l) or (wt. %) | | | | | | Reagent Consumptions (g/g $CN^-_{TOT}$) | |
|---|---|---|---|---|---|---|---|---|
| | $CN^-_{TOT}$ | $SCN^-$ | Cu | Ni | Fe | Zn | $SO_2$ | Lime |
| Stage II Effluent | 1.5 | 237 | 0.2 | 0.2 | 0.2 | 0.2 | 0.28 | 1.52 |

TABLE XIX
CYANIDE REMOVAL FROM DILUTE WASTE STREAMS WITH PRE-ADDITION OF $SO_2$

Conditions: Batch, 22° C., 0-2 minutes: $SO_2$ addition at 4.2 g/l/h as 2.5% volume $SO_2$ in nitrogen mixture, pH 9, 2-15 minutes: aeration at 60 liters/h/l.

| Test | Time (min) | $SO_2$ Added (g/l) | Analysis (mg/l) | | | |
|---|---|---|---|---|---|---|
| | | | $CN^-_{TOT}$ | $SCN^-$ | Cu | Ni |
| S-1 | 0 | 0 | 8.7 | 48 | 2.2 | 0.6 |
| | 2 | 0.14 | <0.5 | 45 | 0.8 | 0.6 |
| | 15 | 0.14 | <0.02 | 46 | 0.4 | 0.4 |

The foregoing Examples set forth in terms of experimental data the ranges of operation of the process of the present invention. With respect to the reaction of simple and complex cyanide with $SO_2$ and oxygen in the presence of copper ion, a pH range of about 5 to about 12 supported by the data in Examples 1, 4 and 9; a practical temperature range of 0° to 50° C. is supported by Example 6 and; a practical pressure range for applied air or oxygen and $SO_2$ ranging from atmospheric up to that minor pressure above atmospheric sufficient to overcome hydrostatic pressure and permit sparging is supported by all the examples related to reaction with CN ion and especially Examples 1 and 16. With respect to pressurized operation above the aforestated range of applied gas pressures, it is deemed that this is not necessary and involves considerable expense. However, the appended claims, in their broadest scope, are not to be deemed so limited as to exclude pressurized operation and optionally operating at temperatures above about 100° C. at super atmospheric pressures if, for any reason, a person desiring to destroy cyanide would wish to do so. It has been noted in a particular commercial installation that when sulfur dioxide and air are fed into a cyanide-containing aqueous effluent also containing copper and suspended solids and that effluent is subjected to hydrostatic pressures of the order of 2000 $KN/m^2$ rapid reaction occurs resulting in destruction of cyanide in a very few seconds. Destruction is essentially complete in that amount of time necessary for transfer of the slurry effluent uphill to a tailings pond. When gaseous $SO_2$ and air are employed in the practice of present invention for destruction of cyanide ion, Example 2 shows that volume ratios of oxygen to $SO_2$ of about 1.25 to 100 are operable. In addition, Example 1 and many of the other Examples show that lime (Ca(OH)$_2$) can be used for pH control over the range of about 5 to 11.

The following Examples describe the application of the process of the present invention to gold mine (or mill) effluent and tailings. Basically gold recovery from ore involves treating a finely comminuted ore with aqueous cyanide and recovering the soluble gold from cyanide solution. Barren liquor and tailings are treated with sulfur dioxide or sulfites and air prior to disposal to a waste site and after essentially all gold recovery operations have been carried out. It will be appreciated that secondary metal (e.g., copper, cobalt, nickel, etc.) recovery might be carried out on cyanide free material such as precipitation as described in Example 12. Detrimental species other than cyanide, e.g., arsenic, can also be removed as described in one or more of the following examples.

In carrying out the process of the present invention on a continuous manner, it is usually required that a volume of water be established which contains cyanide at most at the discharge level and also contains copper as a solid in cyanide-soluble form. Experience has shown that the process of the present invention at least in part involves a reaction wherein cyanide is oxidized to the less harmful cyanate. This reaction is catalyzed by the presence of the soluble copper and proceeds most expeditiously when all reactable cyanide is complexed as copper, zinc or nickel complex cyanides. Cyanide complexed with iron as ferrocyanide is not oxidized in the present process.

As a method of initiating a continuous process in accordance with the present invention, we prefer to initially operate the process as a batch in whatever reaction vessel is available. When the batch is fully reacted, the cyanide content is low e.g. below 1 ppm and copper hydroxide as a product is present in the reacted batch, continuous operation is started. If, for any reason, copper hydroxide or any cyanide-soluble solid copper compound (other than copper ferrocyanide) disappears from the reaction volume, the continuous process can be reestablished by introduction of such solid copper compound into the reaction volume and restarting as a batch, if necessary.

EXAMPLE 19

Examples of two stage continuous treatment of gold mill effluent containing nickel in solution using $SO_2$, air and lime, with and without solids separation between stages are given in Table XX. The results show a substantial improvement in the effectiveness of the second stage when solids have been removed, as the total cyanides ($CN_T$) in the treated effluent was decreased from 6.4 mg/L to 0.7 mg/L.

EXAMPLE 20

An example of two stage continuous removal of cyanide from gold mill tailings slurry (36.8 wt. % solids) using $H_2SO_3$, air and lime is given in Table XXI. The $H_2SO_3$ solution was prepared by sparging $SO_2$ gas (mixture of 15% $SO_2$ and 85% $N_2$) in water at 23° C. The preferred pH is 8 for slurry treatment. Neither $H_2SO_3$ nor lime was added in the second stage. Although copper addition (as $CuSO_4$) was not required, it was added at the equivalent of 50 mg/L to the first stage and this resulted in improved reaction rate. With no copper addition, a retention time of 60 minutes per stage was required.

EXAMPLE 21

An example of continuous cyanide removal from gold mill barren solution and tailings slurry using $Na_2SO_3$ and/or $Na_2S_2O_5$ and air is given in Table XXII. The treatment comprises two stages. In the first stage barren solution is treated at 23° C. and pH 9.05 with $Na_2SO_3$, air and 100 mg/L $Cu^{++}$. The treated barren solution is then reacted together with tailings slurry in the second stage using a mixture of $Na_2SO_3$ and $Na_2S_2O_5$ and air at 23° C. and pH 8. No lime addition is required. In this approach advantage is taken of the copper which is present in the treated barren solution, which upon redissolution in the tailings slurry can act as additional copper catalyst in stage 2. The approach also shows that adequate choice of $SO_2$ reagents ($Na_2SO_3$, $Na_2S_2O_5$ or mixtures thereof) can be used advantageously for pH control.

EXAMPLE 22

An example of two stage continuous cyanide and arsenic removal from gold mill effluent containing a high arsenic concentration in solution using $Na_2S_2O_5$, $Cu^{++}$, $Fe^{+++}$, air and lime as the reagents is shown in Table XXIII.

TABLE XX

TWO STAGE CONTINUOUS CYANIDE REMOVAL FROM HIGH NICKEL GOLD MILL EFFLUENT LIQUOR

Conditions:
- Test A: Stage I: 23° C., 20 minutes retention, $SO_2$: 2.57 g per l of feed, pH 9, 30 L of air per l of feed, Cu added (as $CuSO_4$ solution): 0.12 g per l of feed.
- Stage II: 23° C., 20 minutes retention, $SO_2$: 0.86 g per l of feed, pH 9.5, 15 L of air per l of feed.
- Test B: Stage I: 23° C., 20 minutes retention, $SO_2$: 2.57 g per l of feed, pH 9, 30 L of air per l of feed, Cu added (as $CuSO_4$ solution): 0.14 g per l of feed.
- Stage II: 23° C., 20 minutes retention, $SO_2$: 0.26 g per l of feed, pH 10, 15 L of air per l of feed.

| Test | Intermediate Solids Removal | Stream | $CN_T$ | SCN | Cu | Ni | Fe | Zn | $Cu^{++}$ | $SO_2$ | Lime |
|---|---|---|---|---|---|---|---|---|---|---|---|
| | | | Analyses (mg/L) | | | | | | Reagents (g/g $CN_T$) | | |
| A | No | Feed | 940 | 230 | 39 | 20 | 118 | 63 | 0.13 | — | — |
| | | Stage 1 | 12 | — | 1.8 | 6.8 | 1.0 | <0.2 | — | 2.71 | 3.79 |
| | | Stage 2 | 6.4 | 170 | 0.2 | 1.2 | 1.6 | <0.2 | — | 0.90 | 1.26 |
| B | Yes | Feed | 940 | 230 | 34 | 20 | 118 | 63 | 0.15 | — | — |
| | | Stage 1 | 10 | 175 | 11 | 3 | <0.2 | <0.2 | — | 2.71 | 3.86 |
| | | Stage 2 | 0.7 | 176 | 0.6 | 0.4 | 0.2 | <0.2 | — | 0.27 | 1.27 |

TABLE XXI

TWO STAGE CONTINUOUS CYANIDE REMOVAL FROM GOLD MILL EFFLUENT SLURRY [36.8% SOLIDS] USING $H_2SO_3$

Conditions:
- Stage I: 23° C., 17 minutes retention, $SO_2$ (added as 8 g/L $SO_2$ in water): 1.33 g per l of feed, pH 8, 21 L of air per l of feed, $Cu^{++}$ addition: 50 mg per l of feed.
- Stage II: 23° C., 17 minutes retention, 21 L of air per l of feed.

| Stream | $CN_T$ | $SCN^-$ | Cu | Fe | Zn | $Cu^{++}$ | $SO_2$ | Lime |
|---|---|---|---|---|---|---|---|---|
| | Analyses (mg/L) | | | | | Reagents (g/g $CN_T$) | | |
| Feed slurry | 199 | 129 | 47 | 7 | 55 | — | — | — |
| Stage 1 Effluent | 6.6 | 91 | 16 | <1 | <0.1 | 0.25 | 2.55 | 7.6 |
| Stage 2 Effluent | 0.2 | 92 | <1 | <1 | <0.5 | 0 | 0 | 0 |

TABLE XXII

TWO STAGE CONTINUOUS CYANIDE REMOVAL FROM GOLD MILL EFFLUENT LIQUOR AND SLURRY

Conditions:
- Stage I: 23° C., 120 minutes retention, $Na_2SO_3$: 5.68 g per l of feed, pH 9.05, 121 l air per l of feed, Cu addition (as $CuSO_4$ solution): 100 mg per l of feed.
- Stage II: 23° C., 22 minutes retention, $Na_2S_2O_5$ 0.325 g per l of feed, $Na_2SO_3$: 0.65 g per l of feed, pH 8, 22.4 l of air per l of feed.

| Stream | Volume (%) | $CN_T$ | Cu | Fe | Zn | $Cu^{++}$ | $Na_2SO_3$ | $Na_2S_2O_5$ |
|---|---|---|---|---|---|---|---|---|
| | | Analyses (mg/L) | | | | Reagents (g/g $CN_T$) | | |
| Stage I Feed (Liquor) | 18.6 | 340 | 44 | 1 | 71 | — | — | — |
| Stage I Effluent | 18.6 | 0.2 | 2 | 0.2 | 2 | 0.29 | 16.7 | 0 |
| Stage II Feed - Stage I Effluent | 18.6 | 0.2 | 2 | 0.2 | 2 | — | — | — |
| Stage II Feed - Slurry (30% Solids) | 81.4 | 48 | 12.4 | 1.4 | 10.2 | — | — | — |
| Stage II Effluent | 100 | 0.47 | 0.6 | 0.2 | <0.1 | 0 | 11.0 | 5.5 |
| Overall | | | | | | 0.22 | 15.3 | 1.35 |

TABLE XXIII

TWO STAGE CONTINUOUS REMOVAL OF CYANIDE FROM HIGH ARSENIC GOLD MILL EFFLUENT

Conditions:
- Stage I: 23° C., 60 minutes retention, $Na_2S_2O_5$: 4.3 g per l of feed, pH 8.5, 60 l of air per l of feed, $Cu^{++}$ addition: 190 mg per l of feed.
- Stage II: 23° C., 60 minutes retention, $Fe^{+++}$ addition [as $Fe_2(SO_4)_3$]: 0.825 g per l of feed, pH 7.

| Stream | Analyses (mg/L) | | | | | Reagents (g/g $CN_T$) | | | |
|---|---|---|---|---|---|---|---|---|---|
| | $CN_T$ | Cu | Fe | Zn | As | $SO_2$ | $Cu^{++}$ | $Fe^{+++}$ | Lime |
| Feed | 550 | 2.5 | 75 | 135 | 630 | — | — | — | — |
| Stage 1 Effluent | 0.6 | 0.2 | 0.2 | 0.1 | 360 | 5.2 | 0.35 | 0 | 4.2 |
| Stage 2 Effluent | 0.1 | 0.1 | <0.1 | 0.9 | 2.2 | 0 | 0 | 1.5 | — |

The approach consists of treating the effluent, at 23° C. and pH 8.5, with $Na_2S_2O_5$, $Cu^{++}$, air and lime in a first stage to remove the cyanide, Cu, Fe, Zn and part of the As, followed by treatment with $Fe^{+++}$ (added as a solution of $Fe_2(SO_4)_3$) in a second stage at 23° C. and pH 7, to remove the remaining arsenic.

EXAMPLE 23

An example of single stage continuous cyanide and arsenic removal from gold mill effluent containing a high arsenic concentration in solution, using $Na_2S_2O_5$, $Cu^{++}$, $Fe^{+++}$, air and lime as the reagents is shown in Table XXIV.

In this approach, all reagents are added simultaneously to perform cyanide and metal removal at pH 6.

EXAMPLE 24

This example demonstrates by data in Table XXV the continuous removal of cyanide from gold mill barren solution and tailings slurry at 23° C. using $Na_2S_2O_5$, air and lime as the reagents. The example relates to a plant scale experiment treating 120 liter/minute of barren solution and 2,100 liter/min of tailings slurry at ~30 wt. % solids (~1,800 liter/min contained liquor). In this approach, the barren solution is treated in a stirred reactor at 22° C. and pH 9.7 with $Na_2S_2O_5$, air and lime. The treated barren effluent overflows into a tailings pump box also receiving the tailings slurry. The total tailings are pumped at an estimated pressure of 450 psi (about 3100 $KN/m^2$) to a tailings pond 300 feet uphill with a retention time of ~8 minutes in pipe.

The example shows that with no addition of $Na_2S_2O_5$ to the tailings, the $CN_T$ at the end of the pipe is 19 mg/L. With addition of $Na_2S_2O_5$ to the tailings, estimated at 0.1 g per L of total tailings, the $CN_T$ was removed to a level of <0.3 mg/L at the tailings pond discharge. The example shows the ability of $Na_2S_2O_5$ to react with CN in a closed pipe using the dissolved oxygen and dispersed air present in the tailings.

TABLE XXIV

ONE STAGE CONTINUOUS REMOVAL OF CYANIDE FROM HIGH ARSENIC GOLD MILL EFFLUENT

Conditions: 23° C., 60 minutes retention, $Na_2S_2O_5$: 3.5 g per l of feed, pH 6, 60 l of air per l of feed, $Cu^{++}$ addition: 50 mg per l of feed, $Fe^{+++}$ addition [as $Fe_2(SO_4)_3$]: 2 g per l of feed.

| Stream | Analyses (mg/L) | | | | | Reagents (g/g $CN_T$) | | | |
|---|---|---|---|---|---|---|---|---|---|
| | $CN_T$ | Cu | Fe | Zn | As | $SO_2$ | $Cu^{++}$ | $Fe^{+++}$ | Lime |
| Feed | 550 | 2.5 | 75 | 135 | 630 | — | — | — | — |
| Treated Effluent | 2.4 | 0.2 | 0.1 | 10 | <0.05 | 4.2 | 0.09 | 3.7 | 13.1 |

TABLE XXV

CONTINUOUS CYANIDE REMOVAL FROM GOLD MILL TAILINGS SLURRY IN PIPE

Conditions:
- Stage I: Barren solution treatment, 23° C., 22 hrs retention time, pH 9.7, $Na_2S_2O_5$ addition: 7.5 g per liter of feed, 140 l air per l of feed.
- Stage II: Treated barren solution overflow + tailings slurry (~30% solids), 23° C., ~8 min. retention in closed pipe; Case 1: No addition of $Na_2S_2O_5$; Case 2: $Na_2S_2O_5$ addition: 0.1 g per liter of total tailings (volume ratio tailings/barren solution = 15), no air addition.

| Stream | Analyses (mg/L) | | | Reagents (g/g $CN_T$) | | Remarks |
|---|---|---|---|---|---|---|
| | $CN_T$ | Cu | Fe | $SO_2$ | Lime | |
| Barren solution feed | 1568 | 356 | 76 | — | — | — |
| Stage 1 Effluent | 9 | 19 | 0.2 | 3.16 | ~1.5 | — |
| Stage 2 Effluent (Case 1) | 19 | 13 | 3.2 | 0 | 0 | No addition of $Na_2S_2O_5$ |
| Stage 2 Effluent (Case 2) | <0.3 | 0.5 | <0.1 | 3.5 | 0 | With addition of $Na_2S_2O_5$ |

We claim:

1. The method for treating aqueous effluent to reduce the total cyanide content of said aqueous effluent solution which comprises treating said effluent solution with an oxygen-containing gas and a reagent from the group consisting of sulfur dioxide, an alkali or alkaline earth metal sulfite or bisulfite, at a pH of about 5 to about 12 in the presence of a copper catalyst.

2. The method in accordance with claim 1 wherein said solution is treated in continuous fashion in one or more stages.

3. The method in accordance with claim 1 wherein the pH is about 5 to about 10.

4. The method in accordance with claim 1 wherein said solution also contains thiocyanate ion and the removal thereof by means of an oxygen-containing gas and a reagent from the group of sulfur dioxide and an alkali or alkaline earth sulfite or bisulfite subsequent to the essentially complete removal of cyanide ion is catalyzed by at least one metal from the group consisting of nickel, cobalt and manganese.

5. The method in accordance with claim 1 wherein pH control is effected by an alkali or alkaline earth metal base.

6. The method in accordance with claim 1 wherein the pH is below 6.5 and the base is limestone.

7. The method in accordance with claim 1 wherein treated solution containing copper in precipitated form is contacted with fresh solution containing cyanide species whereby said copper dissolves and catalyzes further impurity removal.

8. The method in accordance with claim 1 wherein a mixture of sulfur dioxide and air is employed which contains about 0.1 to about 6% sulfur dioxide, by volume.

9. The method in accordance with claim 1 wherein the ratio of copper to total cyanide is at least about 0.25 gm/gm.

10. The method in accordance with claim 1 wherein said effluent solution contains up to 1000 ppm of total cyanide.

11. The method in accordance with claim 1 wherein sulfur dioxide and air are employed in admixture.

12. The method in accordance with claim 8 wherein said sulfur dioxide and air are introduced with agitation.

13. The method in accordance with claim 1 wherein an agent from the group consisting of sulfur dioxide and alkali and alkaline earth metal sulfites and bisulfites is first introduced into said effluent solution and oxygen is thereafter introduced.

14. The method in accordance with claim 13 wherein said effluent solution is quiescent during said oxygen introduction.

15. The method in accordance with claim 1 wherein an agent from the group consisting of calcium sulfite, calcium bisulfite, and a combination of sulfur dioxide and lime is employed along with said oxygen-containing gas and the solution pH is maintained in the range of 5 to 7.

16. The method in accordance with claim 1 wherein the process is carried out at a pH in the range of 5 to about 8 and the pH is raised to about pH 10 after cyanide removal to hydrolyze metals contained in the effluent solution, thereby permitting metal recovery by solid-liquid separation.

17. The method in accordance with claim 1 wherein said aqueous effluent solution is the aqueous phase in a slurry containing solids derived from material subjected to cyanidation.

18. The method in accordance with claim 1 wherein said effluent solution is treated in stages, with recycle of precipitated solids containing catalyst metal to treat fresh solution whereby overall rate of cyanide removal is increased.

19. The method for treating effluent solution and tailings from gold mining operations, said operations involving the leaching of comminuted gold ore with aqueous cyanide and recovery of soluble gold from said aqueous cyanide solution comprising treating essentially gold-barren aqueous effluent and tailings to reduce the total cyanide content thereof with an oxygen-containing gas and a reagent from the group consisting of sulfur dioxide and an alkaline earth or alkali metal sulfite or bisulfite at a pH of about 5 to about 12 in the presence of a copper catalyst at ambient temperature for said effluent and tailings and discharging said effluent and tailings to a disposal site without interposing any gold recovery operation between said treatment and said disposal site.

20. A method as in claim 19 wherein said effluent solution and tailings contain arsenic and said arsenic is removed from aqueous phase by treating with ferric ion.

21. A method as in claim 20 wherein said ferric ion is added after treatment to remove cyanide and at a pH of about 6 to 7.

* * * * *